(12) United States Patent
Groom

(10) Patent No.: US 11,013,354 B1
(45) Date of Patent: May 25, 2021

(54) SHRIMP PEELER AND DEVEINER

(71) Applicant: Timothy M. Groom, Liberty, MS (US)

(72) Inventor: Timothy M. Groom, Liberty, MS (US)

( * ) Notice: Subject to any disclaimer, the term of this patent is extended or adjusted under 35 U.S.C. 154(b) by 0 days.

(21) Appl. No.: 17/088,165

(22) Filed: Nov. 3, 2020

(51) Int. Cl.
*A47G 21/00* (2006.01)
*A47G 21/06* (2006.01)
*A22C 29/02* (2006.01)

(52) U.S. Cl.
CPC .......... *A47G 21/061* (2013.01); *A22C 29/026* (2013.01)

(58) Field of Classification Search
CPC ............................ A47G 21/061; A22C 29/026
USPC ......................................... 452/102–105, 5–11
See application file for complete search history.

(56) References Cited

U.S. PATENT DOCUMENTS

| | | | | |
|---|---|---|---|---|
| 2,648,094 A * | 8/1953 | Paoli | ................... | A22C 29/022 452/3 |
| 2,857,620 A * | 10/1958 | Joseph | ................. | A22C 29/022 452/3 |
| 3,271,814 A * | 9/1966 | Gorton, Jr. | ........... | A22C 29/024 452/3 |
| 3,353,207 A | 11/1967 | Weinberger | | |
| 3,777,333 A * | 12/1973 | Adams | ................... | A22C 29/00 452/3 |
| 4,553,287 A * | 11/1985 | DeSordi | ............... | A22C 29/022 452/3 |
| 4,759,126 A * | 7/1988 | McCoy | ................ | A22C 29/022 30/120.1 |
| 4,771,512 A | 9/1988 | Kribbs | | |
| 4,967,446 A | 11/1990 | Padel | | |
| 6,450,871 B1 * | 9/2002 | Morrison, Jr. | ........ | A22C 25/006 452/6 |
| 7,527,549 B1 * | 5/2009 | Goodman | ............ | A22C 29/024 452/102 |
| 2012/0190282 A1 * | 7/2012 | Rizzo | ................... | A22C 29/027 452/6 |

FOREIGN PATENT DOCUMENTS

CN         202354300         8/2012

* cited by examiner

*Primary Examiner* — Richard T Price, Jr.
(74) *Attorney, Agent, or Firm* — George L Williamson

(57) ABSTRACT

Method and apparatus for a handheld tool having a handle on one end along with a blunt ended probe-like arcuate shaped portion on the opposite end which probe is inserted into the shrimp for simultaneously peeling and deveining the shrimp. The handle is designed for being grasped in the hand of a user. The probe has a base-like ricasso portion which acts as a stop for the body of the shrimp so that when the body of the shrimp is pushed against the ricasso the meat is removed from the shrimp by separating the meat from the shell of the shrimp. In operation, the device or tool is inserted along the back of the shrimp at the dorsal portion of the shell and the shrimp is pushed forward and pinched at the same time so that the shrimp is peeled and deveined simultaneously.

14 Claims, 2 Drawing Sheets

SHRIMP PEELER AND DEVEINER

BACKGROUND OF THE INVENTION

Field of the Invention

The present invention relates generally to devices for cleaning seafood, particularly crustaceans, and, more particularly, is concerned with a handheld device for peeling and deveining a shrimp.

Description of the Related Art

Devices relevant to the present invention have been described in the related art; however, none of the related art devices disclose the unique features of the present invention.

In U.S. Pat. No. 4,759,126 dated Jul. 26, 1988, McCoy, et al., disclosed a knife for deveining, peeling and butterflying shrimp. In U.S. Pat. No. 3,353,207 dated Nov. 21, 1967, Weinberger disclosed a shrimp sheller and deveiner. In U.S. Pat. No. 4,967,446 dated Nov. 6, 1990, Padel disclosed a shrimp deveining device. In U.S. Pat. No. 3,777,333 dated Dec. 11, 1973, Adams disclosed a shrimp cleaning device. In U.S. Pat. No. 4,771,512 dated Sep. 20, 1988, Kribbs disclosed a tool for peeling and deveining shrimp. In Chinese Patent No. CN 202354300 dated Aug. 1, 2012, Li disclosed a shrimp intestine remover.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a handheld device having a handle on one end along with a blunt ended probe-like arcuate shaped portion on the opposite end which probe is inserted into the shrimp for simultaneously peeling and deveining the shrimp. The handle is designed for being grasped in the hand of a user. The probe has a base-like ricasso portion which acts as a stop for the body of the shrimp so that when the body of the shrimp is pushed against the ricasso the meat is removed from the shrimp by separating the meat from the shell of the shrimp. In operation, the device or tool is inserted along the back of the shrimp at the dorsal portion of the shell and the shrimp is pushed forward and pinched at the same time so that the shrimp is peeled and deveined simultaneously.

An object of the present invention is to peel and devein the shrimp simultaneously in a single operation which leaves the shell intact. A further object of the present invention is to preserve the integrity of the body of the shrimp without cutting or mutilating the body of the shrimp. A further object of the present invention is to provide a device for peeling and deveining a shrimp which can be easily operated by a user. A further object of the present invention is to provide a device for peeling and deveining a shrimp which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
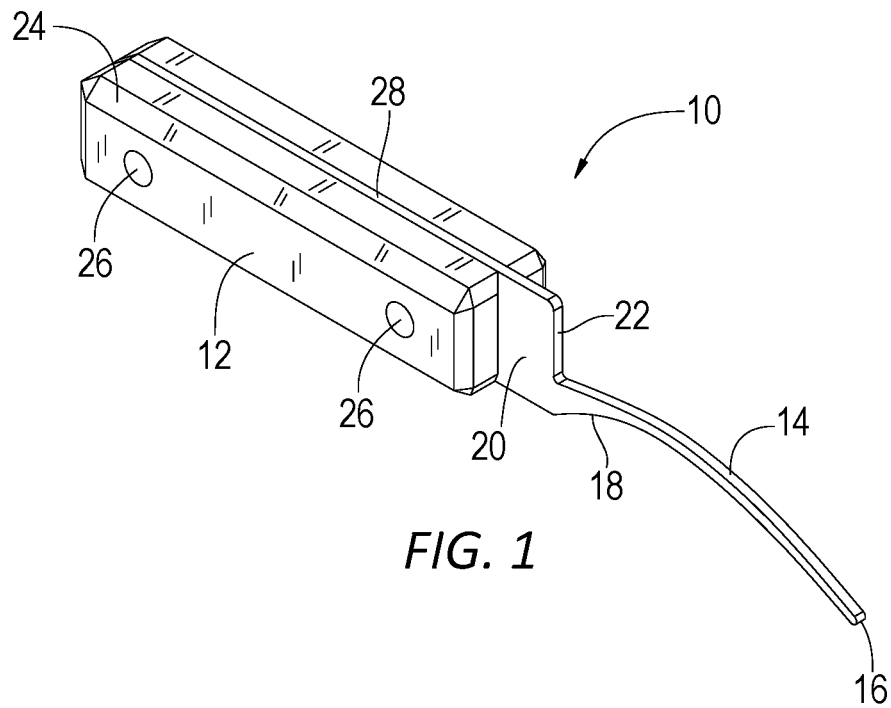
FIG. 1 is a perspective view of the present invention.

With regard to reference numerals used, the following numbering is used throughout the drawings.
10 present invention
12 handle
14 probe
16 blunt end/distal end of probe
18 proximate end of probe
20 ricasso
22 stop portion of base
24 beveled edge portion of handle
26 rivets
28 tang portion of probe
30 shrimp
32 shell
34 meat/body of shrimp
36 vein
38 de-headed end of shrimp
40 fingers of hand of user

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 7 illustrate the present invention wherein a device for simultaneously peeling and deveining a shrimp is disclosed and which is generally indicated by reference numeral 10.

Figure 2:
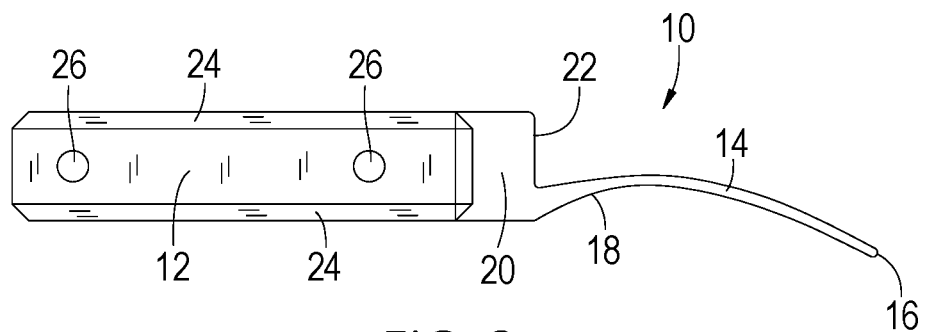
FIG. 2 is a side elevation view of the present invention.
Figure 3:
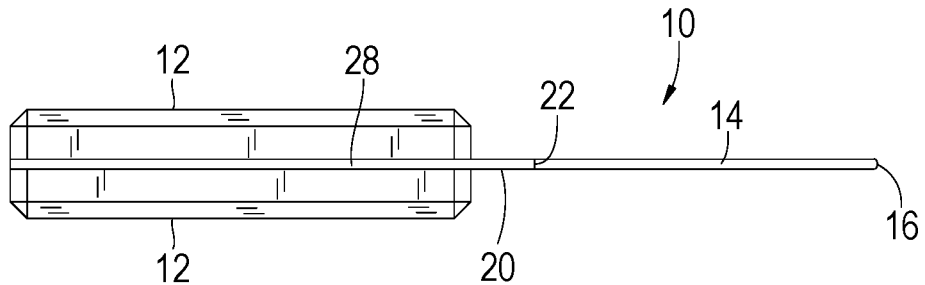
FIG. 3 is a top view of the present invention.

Turning to FIGS. 1-3, therein is shown the present invention 10 having a handle on one end for being grasped in the hand of a user along with an arcuate shaped probe 14 on the opposite end which probe serves as a shaft or projection for insertion into a shrimp as will be explained hereinafter. The probe 14 has a blunt end on its rectangular shaped point/tip 16 and an arcuate portion 18 along with a ricasso portion 20 having a blunted stop 22 on its front end which serves as a stop for removing the meat from inside the shell of the shrimp as will be illustrated hereinafter. The handle 12 also has beveled edges 24 for artistic appeal along with a plurality of rivets 26 for attaching the handle to the tang/shank 28 of the present invention 10. The present invention 10 discloses a handheld tool that has some similarity in shape and design to a kitchen knife although the probe 14 of the present invention 10 is very thin and is not sharpened. The present invention 10 is designed to be used to remove the shell from the shrimp and devein the shrimp simultaneously while leaving the shell intact. The present invention 10 would be held in one hand by a user and the shrimp would be placed onto the probe 14 at the other end of the tool and then the tool would be inserted along the back of the shrimp and the shrimp would be pushed forward and squeezed or pinched at the same time to peel and devein the shrimp simultaneously while leaving the meat from the shell intact.

The present invention 10 would save an operator or user time and energy while peeling and deveining a shrimp in a single, quick motion. A further advantage of the present invention is that it provides an easy and simple way to devein a shrimp without cutting the user's hands during the process because it has no cutting blade or edge. A prototype of the present invention 10 has been built and has the following approximate measurements: the tang 28 has a thickness of about ³⁄₃₂" and a height of about 0.75"; the ricasso 20 has a height of about 0.75" and a length of about 0.5"; the stop 22 has a height of about 0.5"; the blunt end 16 of probe 14 has a height of about ¹⁄₃₂" and probe 14 has a height of about ³⁄₃₂" at a point intermediate its length and is curved to approximate the curvature, i.e., the radius of curvature, of a body of a shrimp 30; the prototype of the present invention 10 measures approximately ½" high, is approximately 6" long and approximately ¾" wide at its widest point, but of course could be produced in various sizes.

It is normal for the head and the shell of the shrimp to be removed prior to eating. Also, many people prefer that the intestinal tract or "vein" of the shrimp be removed prior to eating. The intestinal tract or vein generally has the diameter of one to two millimeters and runs in a parallel manner from the head of the shrimp along the upper length of the abdominal musculature or "tail" of the shrimp to the base of the tail fin. The vein is normally situated approximately one to two centimeters beneath the surface of the dorsal portion of the shell of the shrimp.

Figure 4:
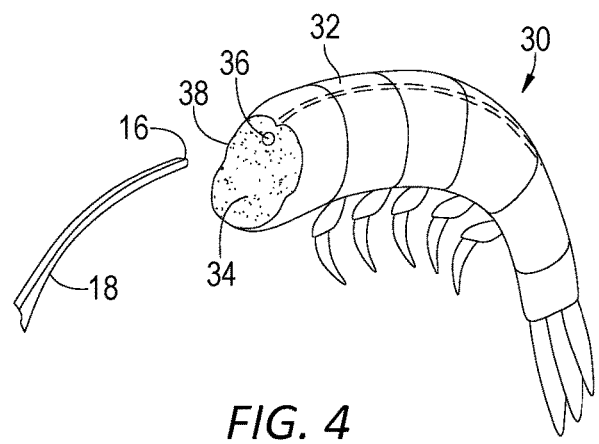
FIG. 4 is a perspective view of a portion of a de-headed shrimp.

Turning to FIG. 4, therein is shown a shrimp 30 along with its shell 32, the meat of the shrimp 34 and the vein 36. The de-headed end 38 on the front of the shrimp 30 is also shown. Also shown is probe 18 with its tip 16 positioned near to the shrimp 30 prior to being inserted into the shrimp.

Figure 5:
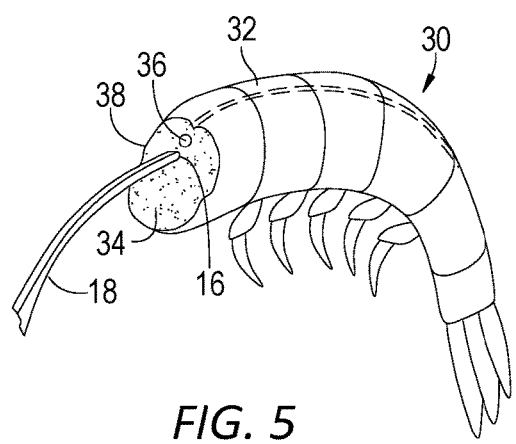
FIG. 5 is a perspective view of a de-headed portion of a shrimp shown in association with the blunt end of the present invention.
Figure 6:
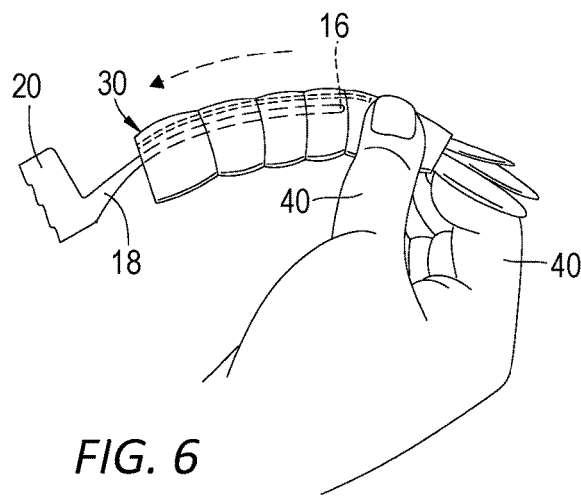
FIG. 6 is a perspective view of a de-headed portion of a shrimp shown with the blunt end of the present invention inserted therein.
Figure 7:
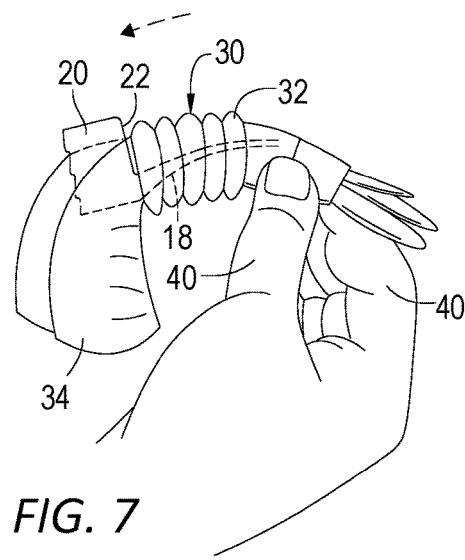
FIG. 7 is a perspective view of a de-headed portion of a shrimp shown on the blunt end of the present invention with the meat partially separated from the shell of the shrimp.

Turning to FIGS. 5 to 7, shown in FIG. 5 is the de-headed end 38 of the shrimp 30 showing the exposed shrimp body or meat 34 including a visible end of the vein 36. FIGS. 6-7 show the operation or use of the present invention 10, wherein the shrimp 30 is normally held in one hand of the operator between the thumb and the forefinger wherein the other hand, i.e., the left hand, grasps the present invention 10 so that it is held firmly and is stationary to allow the blunt end 16 of the probe to be inserted into the shrimp below the vein 36 and the shell 32 of the shrimp 30 and then to thread the probe 14 along the back of the shrimp and then to push the shrimp forward and pinch the shell inwardly at the same time so that the front 38 of the meat of the shrimp is stopped against the stop 22 of the ricasso 20 of the probe 14 so that the shell is removed from the shrimp while at the same time removing the vein from the shrimp while maintaining the meat 34 of the shrimp 30 in an un-mutilated condition. This procedure allows the meat 34 of the shrimp 30 to fall into the palm of the right hand 40. FIG. 7 also shows the meat 34 of shrimp 30 is removed below the ricasso 30 of the present invention 10.

By way of summary and by reference to FIGS. 1-7, the present invention 10 may be described as a tool for peeling and deveining shrimp 30 having a) an arcuate probe 14 and a handle 12, the handle configured to be grasped with a hand 40, the arcuate probe configured to approximate and substantially match the curve of a body of the shrimp and having a proximal end and a distal end 16; b) a tang 28 disposed in the handle and having a proximal end and a distal end; c) a ricasso 20 disposed between the proximal end of the probe and the distal end of the tang; d) a stop 22 disposed on a front of the ricasso to permit the shrimp to be stopped when the arcuate probe is inserted longitudinally into a body of the shrimp and the shrimp peeled and deveined; and e) the arcuate probe, the tang, and the ricasso having an integral fillet formation so that the arcuate probe 14, the tang 28, and the ricasso 20 form a unitary structure. The fillet formation is seen as a thin, narrow, flat, strip of material in FIGS. 1 and 3. Also, wherein a tip of the arcuate probe has a blunt end thereon, and, wherein the tip has a rectangular shaped cross-section, and, wherein a curved portion of the arcuate probe extends from the stop to the tip, and, wherein the stop has a height between about 60% and 80% of the ricasso, and, wherein the ricasso is at least about 0.4 inches in length, and, wherein the ricasso is about the same height as the tang. FIG. 2 shows an elevation view with the vertical height and longitudinal length of the present invention 10; also, FIG. 3 shows the thickness of tang 28, ricasso 20, and probe 14.

I claim:

1. A tool for peeling and deveining shrimp, comprising:
   a) an arcuate probe extending out of a handle, said handle configured to be grasped with a hand, said handle comprising a pair of members sandwiching a tang portion of said probe, said arcuate probe configured to substantially match the radius of curvature of a body of the shrimp and having a proximal end and a distal end;
   b) said tang portion disposed in said handle extending out from a distal end thereof adjacent said probe;
   c) said tang portion extending out from said handle comprising a ricasso disposed between said proximal end of said probe and said distal end of said tang;
   d) said ricasso forming a stop facing said probe to permit the shrimp to be stopped when said arcuate probe is inserted longitudinally into a body of the shrimp and the shrimp peeled and deveined; and
   e) said arcuate probe, said tang, and said ricasso having an integral fillet formation so that said arcuate probe, said tang, and said ricasso form a unitary structure.

2. The tool of claim 1, wherein a tip of said arcuate probe has a blunt end thereon.

3. The tool of claim 2, wherein said tip has a rectangular shaped cross-section.

4. The tool of claim 3, wherein a curved portion of said arcuate probe extends from said stop to said tip.

5. The tool of claim 4, wherein said stop has a height between about 60% and 80% of said ricasso.

6. The tool of claim 5, wherein said ricasso is at least about 0.4 inches in length.

7. The tool of claim 6, wherein said ricasso is about the same height as said tang.

8. A method of making and using a tool for peeling and deveining shrimp, comprising the steps of:
   a) providing an arcuate probe and a handle, the handle configured to be grasped with a hand, said handle comprising a pair of members sandwiching a tang portion of said probe, the arcuate probe configured to substantially match the radius of curvature of a body of the shrimp and having a proximal end and a distal end;
   b) forming a tang in the handle extending out therefrom and adjacent said probe;
   c) forming a ricasso in said tang between the proximal end of the probe and a distal end of the tang;
   d) providing a stop on a front of the ricasso to permit the shrimp to be stopped when the arcuate probe is inserted longitudinally into a body of the shrimp and the shrimp peeled and deveined;
   e) wherein the arcuate probe, the tang, and the ricasso have an integral fillet formation so that the arcuate probe, the tang, and the ricasso form a unitary structure;
   f) grasping said handle;
   g) placing a shrimp on the distal end of said probe; and
   h) inserting said probe along a back of the shrimp, with the shrimp being pushed forward and squeezed or pinched at the same time to peel and devein the shrimp simultaneously while leaving the meat from the shell intact.

9. The method of claim 8, wherein a tip of the arcuate probe has a blunt end thereon.

10. The method of claim 9, wherein the tip has a rectangular shaped cross-section.

11. The method of claim 10, wherein a curved portion of the arcuate probe extends from the stop to the tip.

12. The method of claim 11, wherein the stop has a height between about 60% and 80% of the ricasso.

13. The method of claim 12, wherein the ricasso is at least about 0.4 inches in length.

14. The method of claim 13, wherein the ricasso is about the same height as the tang.

* * * * *